US011477086B2

United States Patent
Klein et al.

(10) Patent No.: US 11,477,086 B2
(45) Date of Patent: Oct. 18, 2022

(54) METHODS AND SYSTEMS FOR PROVISIONING AND COMMISSIONING AN INDUSTRIAL GATEWAY

(71) Applicant: SCHLUMBERGER TECHNOLOGY CORPORATION, Sugar Land, TX (US)

(72) Inventors: Felipe Klein, Sugar Land, TX (US); Vincent Rondot, Montpellier (FR); Muhammad Moeen Yaqoob, Katy, TX (US); Mathieu Dautriche, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 154 days.

(21) Appl. No.: 16/869,990

(22) Filed: May 8, 2020

(65) Prior Publication Data
US 2020/0358656 A1   Nov. 12, 2020

Related U.S. Application Data

(60) Provisional application No. 62/845,083, filed on May 8, 2019.

(51) Int. Cl.
*H04L 41/12* (2022.01)
*G06F 9/4401* (2018.01)
*H04L 45/02* (2022.01)
*H04L 12/66* (2006.01)
*G16Y 30/00* (2020.01)

(52) U.S. Cl.
CPC ............ *H04L 41/12* (2013.01); *G06F 9/4416* (2013.01); *H04L 12/66* (2013.01); *H04L 45/02* (2013.01); *G16Y 30/00* (2020.01)

(58) Field of Classification Search
CPC .............................. G06F 9/4416; G16Y 30/00
See application file for complete search history.

(56) References Cited

U.S. PATENT DOCUMENTS

2015/0153980 A1\* 6/2015 Ito ..................... H04L 63/0281
358/1.14
2020/0084277 A1\* 3/2020 Somaraju ............ H04L 12/2807

FOREIGN PATENT DOCUMENTS

WO    WO-9519672 A2 \*  7/1995  ............. G06Q 20/02

\* cited by examiner

*Primary Examiner* — Zhensheng Zhang

(57) ABSTRACT

A method of commissioning and provisioning an Industrial Internet of Things (IIOT) gateway that includes sending gateway information to a bootstrapping system and generating a commissioning token using the bootstrapping system. The method also includes storing the commissioning token in the bootstrapping system and associating it with a backend system. The method further includes inputting the commissioning token into the IIOT gateway and communicating the IIOT gateway to the bootstrapping system.

16 Claims, 4 Drawing Sheets and performing a series of filters of a dictionary of devices using properties of devices in the dictionary of devices and determined properties of the detected device until the detected device is identifiable by the unfiltered devices remaining in the dictionary of devices.

METHODS AND SYSTEMS FOR PROVISIONING AND COMMISSIONING AN INDUSTRIAL GATEWAY

CROSS-REFERENCE TO RELATED APPLICATIONS

The application claims priority from U.S. Ser. No. 62/845,083, filed May 8, 2019, the complete disclosure of which is hereby incorporated by reference herein

FIELD

The subject disclosure relates to provisioning and commissioning an industrial gateway.

BACKGROUND

This disclosure generally relates to a secure method of provisioning and commissioning an industrial gateway. Gateways in industrial locations may be deployed in various locations and can establish connections with a network and edge assets. They may also require the downloading of specific software or applications to perform their intended use in the field.

The gateways can be deployed in remote locations that do not allow a field technician access to full connectivity while performing installation. Furthermore, a person on-site or repeated trips to the site for installing and troubleshooting devices may incur an increased cost to operation. In addition, common manufacturing processes of gateways prevent a straightforward and secured integration of field devices into the industrial internet of things (IIOT) ecosystem.

Therefore, a need exists for methods and systems of commissioning and provisioning IIOT gateways in a secure and efficient manner, without additional expertise or experience by a person performing the installation of the IIOT gateway.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In an embodiment, a method of identifying and verifying an Industrial Internet of Things (IIOT) gateway is described. The method includes: sending IIOT gateway information to a bootstrapping system from a backend system wherein the bootstrapping system generates and stores a commissioning token; associating the commissioning token with the backend system; inputting the commissioning token into the IIOT gateway; communicating the IIOT gateway to the bootstrapping system; and identifying and verifying the IIOT gateway with the bootstrapping system.

In an embodiment, a system for commissioning and provisioning an Industrial Internet of Things (IIOT) gateway is described. The system includes a backend system and a bootstrapping system in communication with the backend system and configured to receive information on the IOT gateway from the backend system and create a commissioning token wherein the commissioning token is unique to the IIOT gateway.

In an embodiment, a method of automatically identifying a device is described. The method includes detecting a device with an Industrial Internet of Things (IIOT) gateway

BRIEF DESCRIPTION OF THE DRAWINGS

The subject disclosure is further described in the detailed description which follows, in reference to the noted plurality of drawings by way of non-limiting examples of the subject disclosure, in which like reference numerals represent similar parts throughout the several views of the drawings, and wherein.

DETAILED DESCRIPTION

Figure 1:
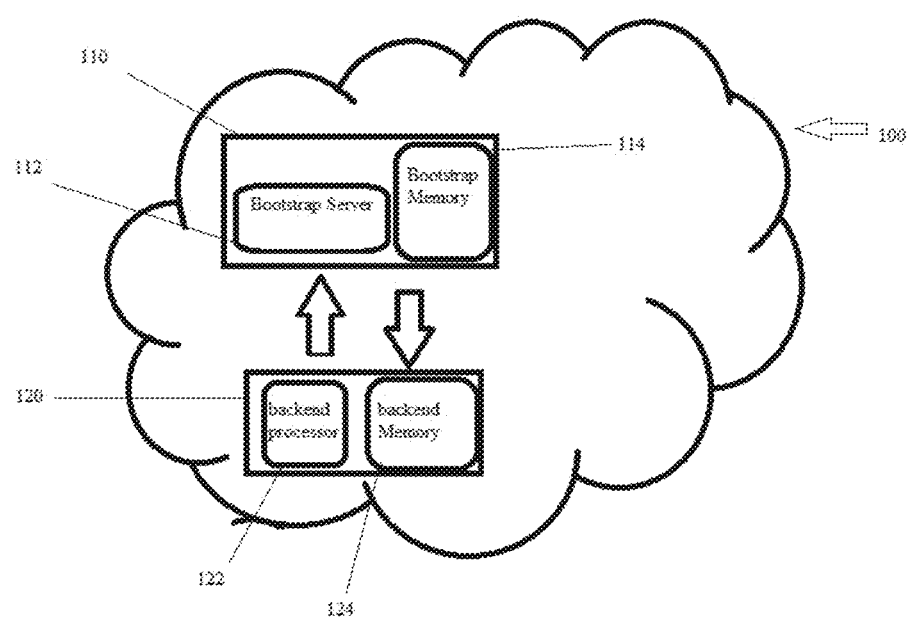
FIG. 1 depicts an example schematic of a system for provisioning and commissioning an IIOT gateway.

The particulars shown herein are by way of example and for purposes of illustrative discussion of the embodiments of the subject disclosure only and are presented in the cause of providing what is believed to be the most useful and readily understood description of the principles and conceptual aspects of the subject disclosure. In this regard, no attempt is made to show structural details in more detail than is necessary for the fundamental understanding of the subject disclosure, the description taken with the drawings making apparent to those skilled in the art how the several forms of the subject disclosure may be embodied in practice. Furthermore, like reference numbers and designations in the various drawings indicate like elements.

One or more specific embodiments of the present disclosure will be described below. These described embodiments are examples of the presently disclosed techniques. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but would be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The disclosed systems and methods use a bootstrapping system, which can be a global device bootstrap server or bootstrapping server, which is the single-entry point of any device being installed, and which can securely redirect the device to the proper backend system that is configured to manage the device. This backend system can be installed on the cloud or on-premises.

In an embodiment, commissioning tokens are provided as an input to a device by a field user at an installation and are then used by a bootstrapping server to identify a backend system that is expecting the device. These commissioning tokens may also be used by the backend system to identify the gateway being installed.

In one or more embodiments, a backend system, such as a cloud service and management system, can be preconfigured to expect a new IIOT gateway for a particular location. The backend systems will have operation instructions for the IIOT gateway to be installed. The operation instructions can include gateway requirements.

The gateway requirements can include a list of job details and functions to be performed. The gateway requirements can include a list of edge assets, such as field equipment, sensors, controllers, that will be connected to the IIOT gateway. The field equipment can include pumps, meters, valves, controllers, and the like. The IIOT gateway may be required to perform one or more functions, accordingly the gateway requirements can include acquiring data related to equipment performance, downhole pressure, downhole temperature, flow rate, and the like. The functions can also include a list of commands the device is expected to support, such as stop motor, set speed, send alert upon a predetermined trigger, or the like.

The backend system also contacts the bootstrapping server to register a new device. The bootstrapping system server will create one or more new commissioning tokens, unique in its validity according to a defined time and date range. For example, the backend system can include memory, one or more processors, and computer instructions to configure the one or more processors to perform one or more operations based on user input. In one or more embodiments, the user input can be that IIOT "gateway ABC" is going to be installed between a certain date range e.g. April 10th and May 15$^{th}$ of a certain year, the processor is configured to send this information to the bootstrapping server, and the bootstrapping server will generate a commissioning token associated with gateway ABC which will expire on May 15$^{th}$. The expiration can be a range of hours, minutes, days, months, weeks, or any other desired range. The commissioning token can be simple and resilient, thereby, reducing the risk that a user will have a transcription error.

The commissioning token can be an alpha numeric token, digital token, or other known or future known tokens. For example, the commissioning token can be a six-digit numerical token. For example, the commissioning token can include five random numbers and to ensure the commissioning token is resilient to transcription error, a one-digit check sum can be added to the first five digits. In one or more embodiments, an error detection algorithm can be used on the gateway to detect common transcription errors. The error detection algorithm can be any now known or future known algorithm configured to instruct a processor on the IIOT gateway to detect common transcription errors. For example, the error detection algorithm can be the Damm Algorithm, which is a check digit algorithm that detects all single digit errors and all adjacent transposition errors.

The bootstrapping server then stores the commissioning token identification information and its relationship with the backend system and sends the commissioning token to the backend system. Accordingly, the bootstrapping server will know that when it receives a commissioning token with the specific token identification information that the IIOT gateway is to be connected with the backend system and other servers or systems as predetermined and provided to the bootstrapping server by the backend system when the commissioning token is created. For example, the backend system can receive input that a certain gateway e.g. ABS will be commissioned on a certain date and will be connected with the backend system and a local server and the local servers web location. The bootstrapping server will generate the commissioning token and set it to expire on a certain date and will also associate it with the backend system and the web location for the local server.

The commissioning token is then delivered by the backend system to a user. For example, the backend system may receive input that a certain user at a certain email address is the assigned person to do the installation, and as such the processor will send the commissioning token to that user. The commissioning token can also be associated with a user account, and the user can log into the backend system and download the commissioning token from a user portal in communication with the backend system. Other known methods or future known methods of delivery may also be used.

The IIOT gateway can be shipped to the installation location. Upon the arrival of the IIOT gateway at the installation location, the user assigned to install the IIOT gateway will input the commissioning token. For example, the user can use a text user interface (TUI) if available on the IIOT gateway to input the commissioning token.

After the commissioning token is entered, the device contacts the bootstrapping system with the entered commissioning token, so that it can be properly redirected to the backend system. For example, the IIOT gateway can have a gateway processor with computer instructions that configure the processor to send communication to the bootstrapping system upon receipt of the commissioning token.

In addition, when the IIOT gateway is manufactured, the version of the firmware stored on the IIOT gateway can have a pair of asymmetric encryption keys. As such, the processor will also be instructed to sign the commissioning token with the public key of the asymmetric encryption keys or sign an identification certification token with the public key. The bootstrapping system uses the private key to confirm the signed commissioning token or signed identification certification token is coming from the appropriate IIOT gateway. The private key can be associated with the public key on the IIOT gateway when the backend system registers the IIOT gateway with the bootstrapping system.

In one or more embodiments, a device management system can generate the public key that matches the private key stored on the bootstrapping server using the commissioning token, and the public key can be used to sign at least one of the commissioning token or identification certification token. In one or more embodiments, a device management system can contain the public key associated with the commissioning token, and the bootstrapping system can have the private key, and the IIOT gateway upon receipt of the commissioning token can be configured to first contact the device management system with the commissioning token; and the device management system can generate an identification certification token and sign it with the public key associated with the IIOT gateway; the signed identification certification token can be sent back to the IIOT gateway, and the IIOT gateway can send the signed identification certification token to the bootstrapping server which will confirm the identification certification token with the associated private key.

Once the bootstrapping system verifies and identifies the IIOT gateway, the bootstrapping system provides the IIOT gateway the information required to be redirected to the backend system and any other servers or websites it is designated to connect to. For example, once the bootstrapping system verifies and identifies the IIOT gateway, the bootstrapping system provides the IIOT gateway the URL or other now known or future known information that allows the IIOT gateway to connect to the backend system and any other servers it may be assigned to communicate with.

The IIOT gateway is now able to contact the backend system with its signed commissioning token or the commissioning token and a signed identification token. The backend system verifies the signed commissioning token or the commissioning token and a signed identification token using the private key associated with the IIOT gateway and identifies the IIOT gateway using the information in the commissioning token or identification token.

The backend server is then instructed to retrieve the expected location and associated operation instructions and send the appropriate information to the IIOT gateway to properly configure the IIOT gateway per the operation instructions. For example, backend sever can be configured to, upon identification and verification of the IIOT gateway, identify from information stored in memory, inputted data associated with the IIOT gateway. In one example, the IIOT gateway ABC may be assigned to field location D to acquire data from equipment at location D. As discussed above, this information is inputted into the memory of the backend system and is associated with IIOT gateway ABC. The processor upon identifying, verifying and establishing communication with that IIOT gateway ABC, will locate the associated information and send the necessary software to allow the IIOT gateway to connect with equipment associated with field location D and any applications for edge processing. In addition, IIOT gateway ABC will be assigned a communication channel for receipt of commands, for sending data, and any other necessary channels. In one or more embodiments, the back-end system can do a channel check with the IIOT gateway and can send a respond command on the command channel and receive a response from the IIOT gateway on the channel for sending data. Other system checks can also be performed using the backend system.

The IIOT device is now in secure communication with the backend system and can be controlled, re-configured, monitored, or the like from the backend system or other servers or cloud systems as assigned.

In one or more embodiments, the IIOT gateway can be un-provisioned and have firmware-based authentication credentials burnt into the firmware, provided by a trusted platform chip, sent from a device management system, or otherwise securely installed on or provided to the IIOT gateway.

In one or more embodiments, after a secure communication is established with the back-end service and system, the IIOT gateway can send location data from a GPS system located on a modem of the IIOT gateway. The location data can be provided to a gateway tracking module in the backend system or other servers or systems in communication with the IIOT gateway. The gateway tracking module can have computer instructions to instruct a processor to receive the location data of the IIOT gateway as well as additional IIOT gateways and generate a graphical representation showing the exact location of each of the gateways.

In addition, the gateway tracking module can use the operation instructions for each IIOT gateway stored in the backend system to populate the graphical representation with identification of edge assets proximate each of the IIOT gateways, software deployed on each of the gateways, and other information from the operation instructions. The graphical representation can be communicated to one or more mobile devices, user devices, or other computing or monitoring systems. The graphical representation can allow a user to easily identify the location of IIOT gateways in a fleet and how they are being used, and if equipment is proximate the gateway that can be connected to the gateway to complete one or more operations in the field.

In addition, the graphical representation, linked operation data, and the like can be used to generate automatic billing for clients for each gateway deployed and used by the client. The billing can include billing for the IIOT gateway from time of installation to time of removal from the field location, bandwidth use, software systems deployed and used, and the like. The client using the IIOT gateway can be determined by the location, for example the IIOT gateway location can be linked in the operation instructions to the assigned client.

In one or more embodiments, the operation instructions can include a list of equipment that can connect to the IIOT gateway. The list of equipment can include equipment identification information for the equipment, for example, it can be an identification number that can be obtained from metadata of the equipment to be connected, IP network information, signal information of heuristic, and the like.

In one or more embodiments, the IIOT gateway can have a field equipment discovery module. The field discovery module can have computer instructions to configure a processor on the gateway to use the equipment identification information to identify and connect to field equipment. For example, the processor can be configured to use the IP network information and heuristic information to send out pings to the devices and recognize the devices by the responses from the devices. In one or more embodiments, the identification module can use a device dictionary, which can be dynamically updated, that has all or at least a large portion of devices and properties of the devices that can be used to identify the devices. Furthermore, the properties of the devices can be grouped into different groups where all the devices share one property and subgroups to allow elimination of possible devices until the correct device is identified. For example, if ten devices are used, and all but one of the devices are modbus devices and support read and write commands, the first group can include the nine devices that are modbus devices and a second group can include the device without the modbus. The identification module will then send a read query, and if the device connecting to the gateway is not responding, the identification module will know that the device is in the first group. Furthermore, now that there are nine possible devices, the identification module will do a subgroup query. The subgroup query can be "write header information", and two devices can have the same header information, and be grouped as subgroup one, and the other seven have the same header information so they will be subgroup two. The identification module will then receive the header information from the device and determine if the group is subgroup one or subgroup two. For example, if it the group is determined to be subgroup one, it will look at the query properties for the two devices in subgroup one e.g. Device one may have set voltage limit of 1 volt and the device two may have a set voltage limit of 1 to 5 volts. The identification module will then instruct the processor on the IIOT gateway to send a set voltage at 2. If an error code is received the processor on the IIOT gateway will be configured by the identification module to determine that the device trying to connect is device one and if no error code is received the processor on the IIOT gateway will be configured by the identification module to determine that the device trying to connect is device two. Once the devices are recognized the field equipment discovery module can connect with the identified devices. However, in some instances, the field equipment discovery module can be isolated from other modules and software in the IIOT gateway and can contain the data from the devices, extract device identification information, e.g., serial number, signed certifications using asymmetric encryption, or other metadata from the connected devices. The field equipment discovery module can also include computer instructions to configure the processor to compare the device identification information to identification information from the operation instructions. Once the device is confirmed to be the correct device, the field equipment discovery module can then allow interconnection of the devices to other modules or segments of the IIOT gateway.

In one or more embodiments, once the assigned devices are connected, the field equipment discovery module can receive a signal if one of the connected devices is removed and can determine if a different device is connected or attempting to connect. For example, a local user could substitute a Meter ABC with Meter DEF, for example by using user credentials to access the IIOT gateway and adding it to the device list. The field equipment discovery module can be instructed to allow the connection of Meter DEF, and extract metadata from Meter DEF and send it to the backend system. The backend system can match the identification information with device catalog information stored in memory on the backend system. The backend system processor can then be configured to use information in the device catalog, e.g., specifications, calibration data, or the like, to determine if new software or telemetry channels are needed. For example, the backend system processor can determine that a different driver is needed for the Meter DEF and can provide that driver to the IIOT gateway. The backend system processor can be configured to determine if different drivers, middleware, or other software is needed and provide these to the IIOT gateway. The processor can also be configured to issue commands to the IIOT gateway to perform a defined calibration operation on Meter DEF or the like.

FIG. 1 depicts an example schematic of a system for provisioning and commissioning an IIOT gateway. The system 100 includes a bootstrapping system 110 and a backend system 120. The bootstrapping system 110 and backend system 120 are in communication.

The bootstrapping system 100 can include a bootstrap server 112 and a bootstrap memory 114. The bootstrap memory 114 can include information and computer instructions to enable and configure the bootstrap server 112 to verify the identity of an IIOT gateway trying to connect to the backend system, create commissioning tokens specific to the IIOT gateway, provide the created commissioning token to the backend system, provide the created commissioning to a user for input into the IIOT gateway, or combinations thereof. The bootstrap memory 114 can also include information and computer instructions to enable and configure the bootstrap server 112 to provide correct information to redirect the IIOT gateway to the backend system.

The bootstrapping system 110 acts as a trusted point of contact for the backend system 120. The backend system 120 includes a backend server and backend memory. The backend memory stores information and computer instructions to configure and enable the backend server to provide commissioning and provisioning to associated IIOT gateways. The backend server 120 is configured to: receive commissioning tokens from the bootstrap system 110, send information on associated IIOT gateways to the bootstrapping system, verify commissioning tokens received from IIOT gateways, configure associated IIOT gateways according to inputted operation instructions specific to each of the IIOT gateways, assign communication paths to associated IIOT gateways, receive acquired data from connected IIOT gateways, structure received data and associate the received data with data type and appropriate IIOT gateway, store the received data in an access controlled location associated with the associated IIOT gateway, communicate data from a connected IIOT gateway to an associated client tenancy and or feed the data to user applications associated with the IIOT gateway sending the data, issue unique commands specific to each of the connected IIOT gateways, or combinations thereof.

Figure 2:
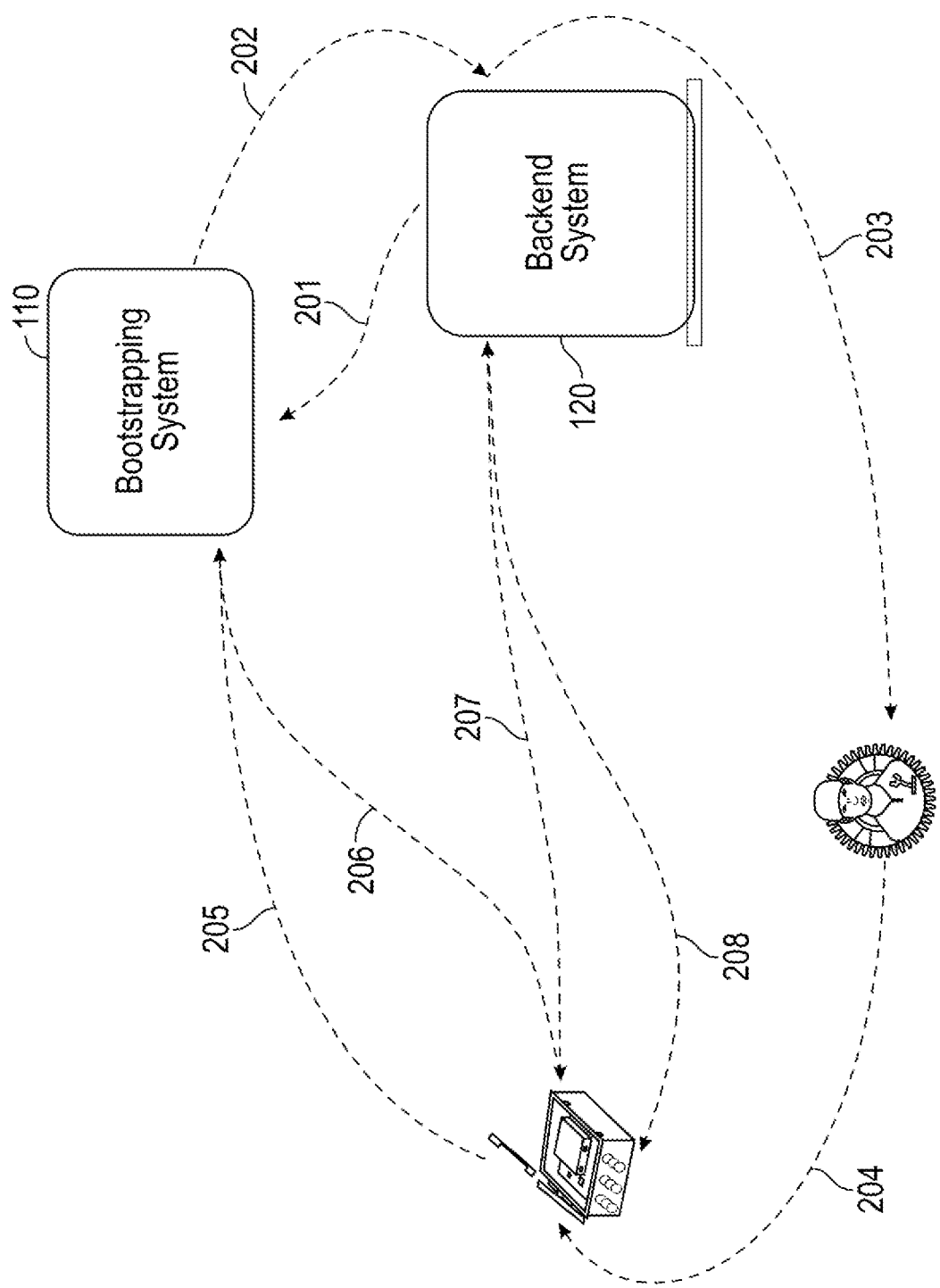
FIG. 2 depicts an embodiment of a method of provisioning and commissioning an IIOT gateway.

FIG. 2 depicts an embodiment of a method of provisioning and commissioning an IIOT gateway. The method includes using a backend system to register an IIOT gateway with the bootstrapping system, as shown at 201. The backend system can register an IIOT gateway upon input from a user that an IIOT gateway is assigned to be installed, and the user providing information specific to the IIOT gateway to be installed. In a non-limiting example, this information may include: identification number, location to be installed, date of installation, at least one private key associated with at least one public key installed on or otherwise made available to the IIOT gateway; at least one public key associated with at least one private key installed on or otherwise made available to the IIOT gateway; operation instructions, or combinations thereof. Registering the IIOT gateway with the bootstrapping system may include the backend system sending the identification number and date of installation of the IIOT gateway to be installed. Registering the IIOT gateway may also include providing the bootstrapping system a private key or public key that is associated with the public key or private key installed on or otherwise made available to the IIOT gateway.

The method can continue as shown at 202, where the bootstrapping system creates a unique commissioning token associated with the IIOT gateway to be installed and sends a copy of the created commissioning token to the backend system. The commissioning token is created by the bootstrapping system using information provided by the backend system and is associated with the IIOT gateway. The commissioning token includes a unique validity date range that includes the expected date of installation. The bootstrapping system can also store the commissioning token and its relationship to the backend system. In addition, if information provided by the backend system to the bootstrapping system indicates that the IIOT gateway is to be allowed to communicate with one or more additional servers, the bootstrapping system would also store this information.

As shown at 203, a field user, who is assigned to install the IIOT gateway, is provided the commissioning token from the backend system. The commissioning token can be provided by email to the field user, downloaded from a user portal, or in other known or future known ways.

As shown at 204, the field user will install the IIOT gateway at the assigned location and will use a text user interface to input the commissioning token to the IIOT gateway.

As shown at 205, the IIOT gateway contacts the bootstrapping system, and sends an identification certification token signed by one key of a pair of keys of an asymmetric cryptography configuration. In non-limiting examples, the one key can be burned into the firmware of the IIOT gateway, the commissioning token and an identification certification token signed by a device management system using one key of a pair of keys of an asymmetric cryptography configuration associated with the IIOT gateway, such as device management systems that are commercially available, or at least one of a signed commissioning token or signed identification certification token that is signed with one key of a pair of keys of asymmetric cryptography configuration burned into the firmware or otherwise obtained. The bootstrapping system verifies the signed information certification or signed commissioning token, by using the other key of a pair of keys of an asymmetric cryptography configuration associated with the IIOT gateway.

In addition, a trusted platform chip can be installed on the IIOT gateway, and as part of the verification process at the bootstrap system, the IIOT gateway can send a token signed with a key of a pair of keys of a trusted platform chip, a hash of critical sections of the firmware, and the bootstrapping system can use the other key of the pair of keys associated with the trusted platform chip associated with the IIOT gateway and/or the hash of critical sections of the firmware to further validate the identification of the IIOT gateway. The key and hash of critical sections of the firmware can be provided to the bootstrapping system as part of the information for the IIOT gateway provide by the backend system.

As shown in 206, after identification and verification of the IIOT gateway, the bootstrapping system sends information required to redirect the IIOT gateway to the backend system and any other assigned servers.

As shown in 207, the IIOT gateway contacts the backend system and provides the commissioning token along with the identification certification token, the signed identification certification token, or the signed commissioning token to the backend system. The backend processor is configured to obtain from memory, after identifying the IIOT gateway and verifying it, user inputs such as operation instructions, location, and the like. The processor of the backend system is then configured to use this information to build a configuration for the IIOT gateway and create credentials for the IIOT gateway.

Building the configuration can include assigning communication channels, identifying and packaging necessary software or applications, and packaging drivers that may be needed for assigned field equipment to connect with the IIOT gateway. In one or more embodiments, creating credentials can include generating a pair of keys of asymmetric cryptography configuration, storing the private key in the backend system and associating it with the IIOT gateway, and sending the public key to the IIOT gateway. The IIOT gateway will use the public key to sign a token, such as an identification certification token, commissioning token, or combinations thereof each time the IIOT gateway contacts the backend system. In one or more embodiments, the credentials do not need to be created. For example, the IIOT gateway can send a token signed by or a public key associated with the trusted platform chip of the IIOT gateway and the backend system will use the stored private key associated with the trusted platform chip of the IIOT gateway to verify the IIOT gateway each time the IIOT gateway attempts to establish communication.

As shown at 208, the backend system sends the built configuration and if needed credentials to the IIOT gateway. The built configuration details will be used to configure the IIOT gateway and the credentials will be used by the IIOT gateway to securely communicate with the backend system. In some instances, instead of providing credentials, for example, if the IIOT gateway has a trusted platform chip, the IIOT gateway can send a token signed by or a public key associated with the trusted platform chip of the IIOT gateway and the backend system will use the stored private key associated with the trusted platform chip of the IIOT gateway to verify the IIOT gateway each time the IIOT gateway attempts to establish communication.

Figure 3:
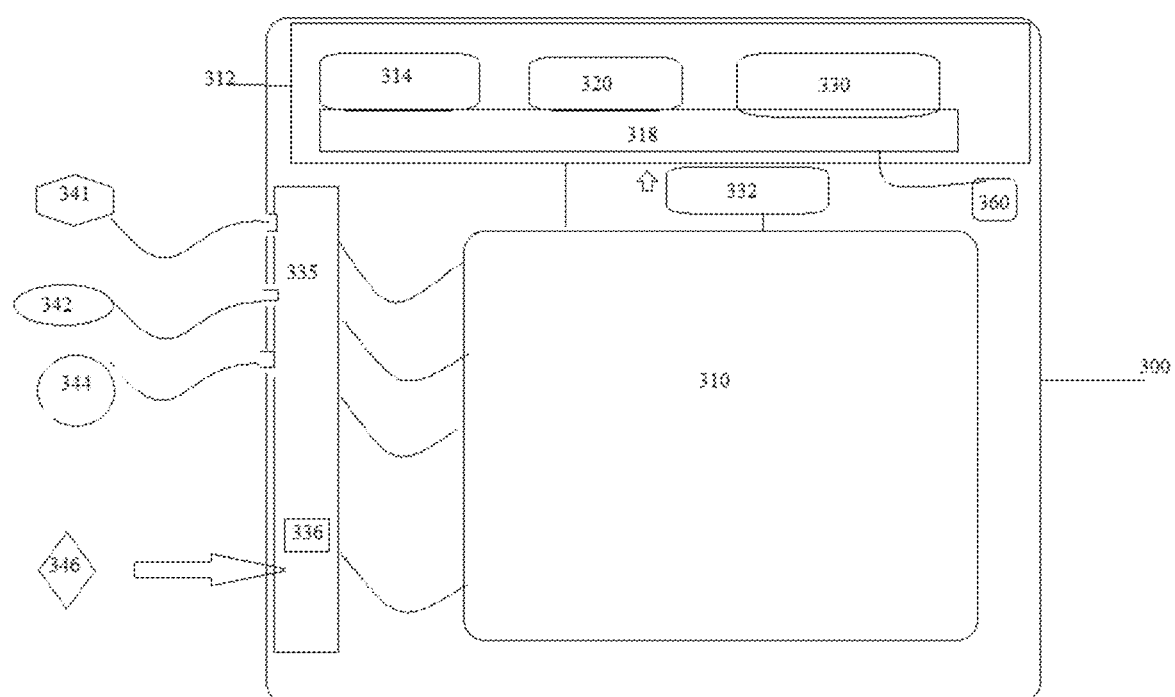
FIG. 3 depicts a schematic of an embodiment of an IIOT gateway.

FIG. 3 depicts a schematic of an embodiment of an IIOT gateway. The IIOT gateway 300 can include one or more gateway processors 310; one or more gateway memories 312; one or more software containers 314; one or more field equipment discovery modules 320; one or more communication modules 330; one or more communication equipment 332; one or more operating systems 318; one or more trusted platform chips 360; one or more processor firmware 312; and one or more device connection buses 335.

The gateway processor 310 may be in communication with the memory 312, the device connection 335, and the communication equipment 332. The processor firmware 312 can be programmed on memory integrated with the processor. The processor firmware 312 can configure the processor to function and initialize the processor and provides other functions to the processor to allow it to interact with the memory and other devices. In addition, the firmware 312 can have a public key for signing identification information embedded therein.

The gateway memory 312 may include an operating system which configures the processor for startup and to communicate with the communication equipment 332 and is configured to send signals to the bootstrapping system or other systems to initiate the commissioning and provisioning process.

After the gateway 300 is placed into communication with the backend system, the backend system can send the configuration build to the gateway including telemetry channel assignments. As such the backend system, based on operation instructions stored and associated with the gateway 300 in the backend system, sends the appropriate one or more software containers 314; one or more field equipment discovery modules 320; one or more communication modules 330, or combinations thereof to the gateway and these are then stored in memory 312.

The one or more software containers 314 can include software to configure the processor to perform certain functions, as provided in the operation instructions. Examples of functions may include data processing, data structuring, event detection, control functions, or other functions that may be required for the gateway 300 to perform the tasks provided in the operation instructions.

The one or more field equipment discovery modules 320 may have computer instructions which configure the gateway processor to use the equipment identification information to identify and connect to field equipment. For example, the processor can be configured to use the IP network information and heuristic information to send out pings to the devices and recognize the devices by the responses from the devices. Once the devices are recognized, the field equipment discovery module can connect with the identified devices. However, the field equipment discovery module can be isolated from other modules and software in the IIOT gateway, and can contain the data from the devices, extract device identification information, e.g., serial number, signed certifications asymmetric encryption, other metadata from the connected devices. The field equipment discovery module can also include computer instruction to configure the processor to compare the device identification information to identification information from the operation instructions. Once the device is confirmed to be correct, the field equipment discovery module allows interconnection of the devices to other modules or portions of the IIOT gateway.

The communication modules 330 include software that instruct the processor to cause the communication equipment to use assigned channels. The channels can include one or more assigned channels for data transmission to the backend system, one or more assigned channels for data transmission to one or more additional servers; one or more assigned channels for receiving commands from the backend system; one or more assigned channels for receiving commands from one or more additional servers, and other channels as needed.

The device connection bus 335 may have one or more connections to allow communication with field equipment. The device connection bus 335 can be configured to use a hardline connection, a wireless connection, or other known or future known types of connections, and can have appropriate protocols for these connections, programmed into firmware thereof. For example, the device connection bus 335 can connect to the first field equipment 341; the second field equipment 342; and the third field equipment 344, using a hardline connection. The device connection bus 335 can also include a wireless receiver configured to communicate with one or more field equipment devices using now known or future known protocols. As shown, the fourth field equipment 346 is connected to the device connection bus 335 via a wireless connection.

The device connection bus 335 can communicate with the processor 310 and the processor 310 can be configured to process data to identify if the data is from the first field equipment 341; the second field equipment 342; the third field equipment 344; or the fourth field equipment 346. The processor can also be configured to process and structure the data and use the data in conjunction with one or more computer instructions in the one or more software modules for event detection, monitoring, or control of the associated field equipment. The processor can also be configured to identify which port/channel on the field connection device is connected to each of the field equipment devices, as such it can associate the data received with the correct field equipment device and send commands to the appropriate field equipment device.

Figure 4:
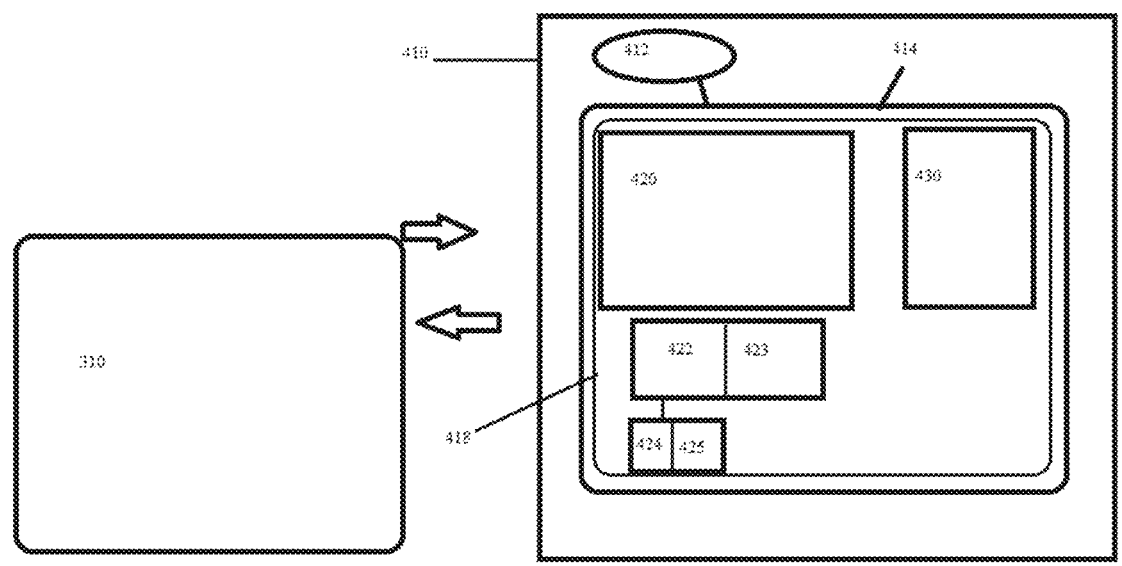
FIG. 4 depicts a schematic of an embodiment of a system.

FIG. 4 depicts a schematic of an embodiment of a system. The system can include an IIOT gateway, such as IIOT gateway 310. The processor of the IIOT gateway can be configured, using computer instructions stored in memory, so that when a device connects with it then it automatically connects with a dictionary 414 that is stored on a server system 410. The server system 410 can be a cloud-based system. The server system 410 can have one or more server processors 412 and one or more memories 414. The one or more memories can be in communication with the processor 412. The IIOT gateway 310 can access a device dictionary 418 that is stored in the memory 414. The dictionary can include one or more groups of devices, two are shown 420 and 430. The groups include a plurality of devices that share one or more control or communication properties. Furthermore, the devices in one group have at least one control or communication property that will not match control or communication properties in other groups. The processor will then use the non-matching property of group 420 and 430 to determine the group the connected device is in. For example, the first group 420 can be modbus devices and the second group can be devices that have a matching protocol but that do not support read/write commands. Each group can include one or more level one subgroups and one or more level two subgroups. For example, first group has first level one subgroups 422 and 423.

Level one subgroups 422, 423 include devices from the associated group 420, for example level one subgroups 422 and 423 include devices from group 420 bundled into smaller groupings using devices that share one or more control or communication properties. Furthermore, the devices in one level one subgroup have at least one control or communication property that do not match control or communication properties in other level one subgroups. The processor will then use the non-matching property of the level one subgroup to determine the subgroup the connected device is in. For example, as discussed above the connected device was determined to be in a first group 420. In this example, the nonmatching property can be those that take temperature measurements and others that do not, first level one subgroup 422 can be the devices that take temperature measurements and first level one subgroup 423 can include devices that do not take temperature measurements. The IIOT gateway would therefore be configured to send a command to the connected device to send temperature data. If an error message is received, then the first level one subgroup 422 contains the connected device.

The second level subgroups such as 424 and 425 can be used to further limit the groupings. This subgrouping can be performed until limited down to one device.

The control or communication properties can include header information, measurement sets, voltage ranges, measurement types, protocol type, commands supported by a protocol, or the like.

In one or more embodiments, before performing or after a group filter is performed, the IIOT gateway can be configured to send a request for header information, and the header information can be used to filter the dictionary for devices that have the same header information. This may provide one device. For example, if the header information has a part number then the device in the dictionary with that part number would be identified as the connected device. However, the header information may not have sufficient information to identify the connected device, so the dictionary would be filtered to have devices with possible matching header information and then the processor 412 can be configured to form groups, level 1 subgroups, level 2 subgroups and so on until the correct device is identified.

A method of automatically identifying detected devices includes, the IIOT gateway communicating with a dictionary of devices. The IIOT gateway can be configured by computer instructions in an application stored thereon or communicated therewith to communicate with the dictionary of devices. The dictionary of devices has a collection of devices. The application can have a playbook for device identification and computer instructions to configure the processor to execute the playbook, or the playbook can be stored in memory in communication with a processor in communication with the dictionary.

The IIOT gateway can be configured to perform the playbook. The playbook can be performing a group filter of groups in the dictionary, querying the connected device for information and performing a filter in the dictionary of devices for matching information or absence of information, or the like.

For example, the playbook may be to request device information. If no information is received, the device dictionary is filtered for devices with no information and these devices are grouped into at least two groups of devices based on having one matching control or communication property. In this instance, one group would include devices with matching control or communication property and the other group would have devices that do not have the matching control or communication property. For example, the property can be a Modbus protocol. Then the IIOT gateway would send a read/write command and if a response is received from the connected device it would choose group one for further filtering. If the IIOT gateway receive no response then it would choose group two. The chosen group is then broken into smaller and smaller subgroups until the connected device can be determined.

In one or more embodiments, an application on the IIOT gateway or in communication with the IIOT gateway, may configure a processor of the IIOT gateway to perform a playbook. The playbook can include determining that a new device is connected with the IIOT gateway; communicating with a dictionary of devices; first requesting device information then if device information is received filtering the dictionary of devices for the device information and if only one device matches the received device information choosing a device as the connected device. If no device information is received or more than one device matches the received device information, grouping the devices in the dictionary of devices by properties or communication protocol and identifying the property with the highest possibility to eliminate the largest amount of devices, continuing with group filtering until the connected device can be identified with the highest level of confidence.

In one or more embodiments, the playbook can include a location filter, for example, the dictionary of devices can be configured to include device location e.g. GPS coordinates, wellsite location. The IIOT gateway would send location information to the dictionary of devices, and a filter for devices that have device locations associated with or proximate to the IIOT gateway location. Once the devices are reduced by location, the devices can be further filtered by device information. If the correct device cannot be determined, then group filtering can be performed using a first property grouping likely to eliminate further devices and the group filtering is continued until the connected device can be identified.

The processor on the IIOT gateway can be configured using the identification application to contact an identification system having the dictionary of devices, at least one processor, and at least one memory in communication with the at least one processor that stores the dictionary of devices and computer instructions to configure the at least one processor to perform the playbook upon commands or information received from the IIOT gateway. For example, sending a request to a processor in communication with the dictionary of devices and configured to do the filtering. For example, the identification application can configure the processor on the IIOT gateway to connect with the identification system upon detection of a device being connected. The identification application can also configure the processor on the IIOT gateway to communicate with a processor of the identification system and execute portions of the playbook while the processor of the identification system can perform other portions of the playbook. For example, the processor on the IIOT gateway can perform the playbook for action that is to be performed at the edge in response to search results obtained by filtering performed using the identification system processor.

In an embodiment, the processor on the edge is configured to determine that a device has connected; establish communication with the identification system, send a first query to the connected device for device information or identify device information from metadata provided by the device when the device was connected; provide device information to the identification system; receive results from the identification system; send a command as instructed by the identification system; send results back to the identification, and so on until the device is identified. The processor of the identification system is configured to receive identification from the IIOT gateway, filter the dictionary of devices using the identification information; determine if the connected device can be determined; if yes send back device information to IIOT gateway, if not separate the devices into groups using at least one device property or communication property that is likely to eliminate devices; and send to the IIOT gateway a command to instruct the IIOT gateway to perform the required action to receive information on the device property or communication property; this can continue until the device can be identified.

In one or more embodiments, the dictionary of devices can be structured such that each device is associated with: an identification number; manufacture of device; common header information associated with the manufacture of the device; type of device; voltage limit of device; commands supported by the device; communication protocol of the device; device modulation signature; a hash of one or more files that are on the firmware of the device; an electric signature of the device; supported command sequences; or the like.

The identification application, the identification system computer instructions, or both can be used to configure the IIOT gateway processor and identification system to execute actions to perform a playbook. For example, the IIOT gateway processor is configured to send commands or request data or extract data that can be used by the identification system processor to perform grouping, filtering, searching, of the device dictionary and identify the properties to be used for device identification and instruct the IIOT gateway processor to perform the actions to receive properties of the device.

Some of the methods and processes described above, can be performed by a processor. The term "processor" should not be construed to limit the embodiments disclosed herein to any particular device type or system. The processor may include a computer system. The computer system may also include a computer processor (e.g., a microprocessor, microcontroller, digital signal processor, or general-purpose computer) for executing any of the methods and processes described above.

The computer system may further include a memory such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device.

Some of the methods and processes described above, can be implemented as computer program logic for use with the computer processor. The computer program logic may be embodied in various forms, including a source code form or a computer executable form. Source code may include a series of computer program instructions in a variety of programming languages (e.g., an object code, an assembly language, or a high-level language such as C, C++, or JAVA). Such computer instructions can be stored in a non-transitory computer readable medium (e.g., memory) and executed by the computer processor. The computer instructions may be distributed in any form as a removable storage medium with accompanying printed or electronic documentation (e.g., shrink wrapped software), preloaded with a computer system (e.g., on system ROM or fixed disk), or distributed from a server or electronic bulletin board over a communication system (e.g., the Internet or World Wide Web).

Alternatively or additionally, the processor may include discrete electronic components coupled to a printed circuit board, integrated circuitry (e.g., Application Specific Integrated Circuits (ASIC)), and/or programmable logic devices (e.g., a Field Programmable Gate Arrays (FPGA)). Any of the methods and processes described above can be implemented using such logic devices.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

The invention claimed is:

1. A method of commissioning a particular Industrial Internet of Things (IIOT) gateway at an installation location, the method comprising:
storing a commissioning token by a bootstrapping system, the commissioning token being associated with the particular IIOT gateway and unique to the particular IIOT gateway;
configuring the bootstrapping system to associate the commissioning token with a backend system;
inputting the commissioning token into the particular IIOT gateway at the installation location;
in response to inputting the commissioning token into the particular IIOT gateway, configuring the particular IIOT gateway to communicate with the bootstrapping system using the commissioning token to verify the particular IIOT gateway and establish communication between the particular IIOT gateway and the backend system associated with the commissioning token; and
in response to communication between the particular IIOT gateway and the backend system, configuring the backend system to verify the particular IIOT gateway and communicate information from the backend system to the particular IIOT gateway in order to commission the particular IIOT gateway at the installation location.

2. The method of claim 1, further comprising:
using the backend system to assign communication channels to the particular IIOT gateway based on operation instructions associated with the particular IIOT gateway, and commissioning the particular IIOT gateway by sending the communication channels from the backend system to the particular IIOT gateway.

3. The method of claim 1, further comprising:
using the backend system to build a field equipment discovery module that identifies and connects to field equipment; and
commissioning the particular IOT gateway by sending the field equipment discovery module from the backend system to the particular IIOT gateway.

4. The method of claim 3, further comprising:
configuring the particular IOT gateway to use the field equipment discovery module to automatically detect assigned devices and to connect to the assigned devices.

5. The method of claim 1, wherein the particular IIOT gateway is verified using at least one of a signed identification certificate token; the commissioning token; a signed identification certificate token; or combinations thereof, which is communicated to the bootstrapping system.

6. The method of claim 1, wherein the particular IIOT gateway is verified using a signed identification certificate from a trusted platform chip installed on the particular IIOT gateway.

7. The method of claim 6, wherein the signed identification certificate is signed with a public key on the particular IIOT gateway and assigned to the particular IIOT gateway, a public key provided to the particular IIOT gateway from a device management system; or combinations thereof.

8. The method of claim 6, wherein the signed identification certificate is signed with a private key on the particular IIOT gateway and assigned to the particular IIOT gateway, a private key provided to the particular IIOT gateway from a device management system; or combinations thereof.

9. The method of claim 1, wherein the commissioning token is valid within a predefined date and time range.

10. The method of claim 1, wherein the backend system is on a cloud computer system.

11. The method of claim 1, wherein the commissioning token is inputted into the particular IIOT gateway by a user at the installation location.

12. The method of claim 11, wherein the user inputs the commissioning token using a Text User Interface (TUI) on the particular IIOT gateway.

13. The method of claim 1, further comprising:
generating the commissioning token at the bootstrapping system based on communication of information pertaining the particular IIOT gateway from the backend system to the bootstrapping system.

14. The method of claim 1, further comprising:
communicating the commissioning token from the bootstrapping system to the backend system; and
configuring the backend system to deliver the commissioning token to a user.

15. The method of claim 1, further comprising:
using the backend system to build a configuration for the particular IIOT gateway based on operation instructions associated with the particular IIOT gateway, wherein the configuration includes software or applications and drivers needed for assigned field equipment to connect to the particular IIOT gateway; and
commissioning the particular IIOT gateway by sending the configuration for the particular IIOT gateway from the backend system to the particular IIOT gateway.

16. The method of claim 1, further comprising:
configuring the particular IIOT gateway to send signals to the bootstrapping system to initiate the commissioning process.

* * * * *